Nov. 11, 1958
K. IRBITIS
2,859,663
GUN BLAST DEFLECTOR
Filed Feb. 28, 1955
2 Sheets-Sheet 1
Fig.1
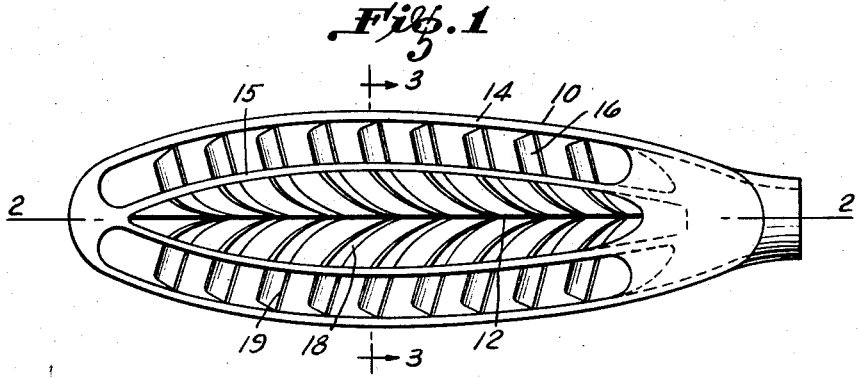
Fig.2
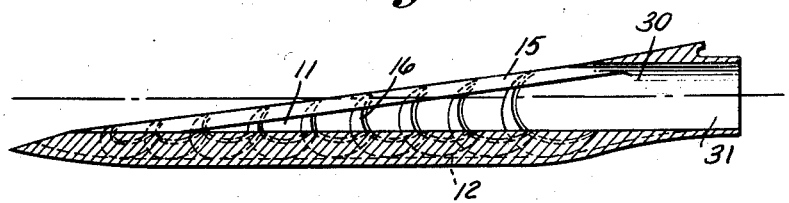
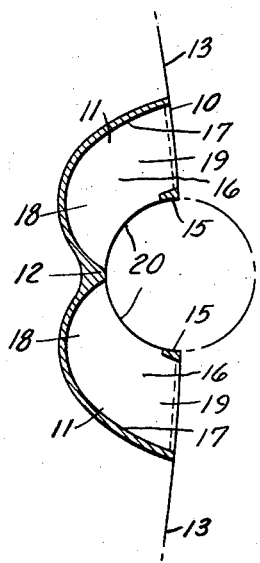
Fig.3
INVENTOR
K. IRBITIS
BY Featherstonhaugh & Co.
ATTORNEYS

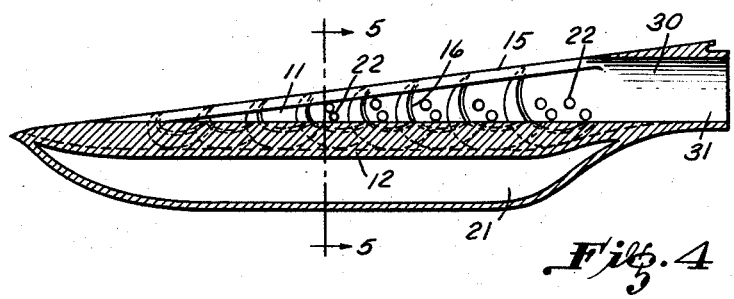
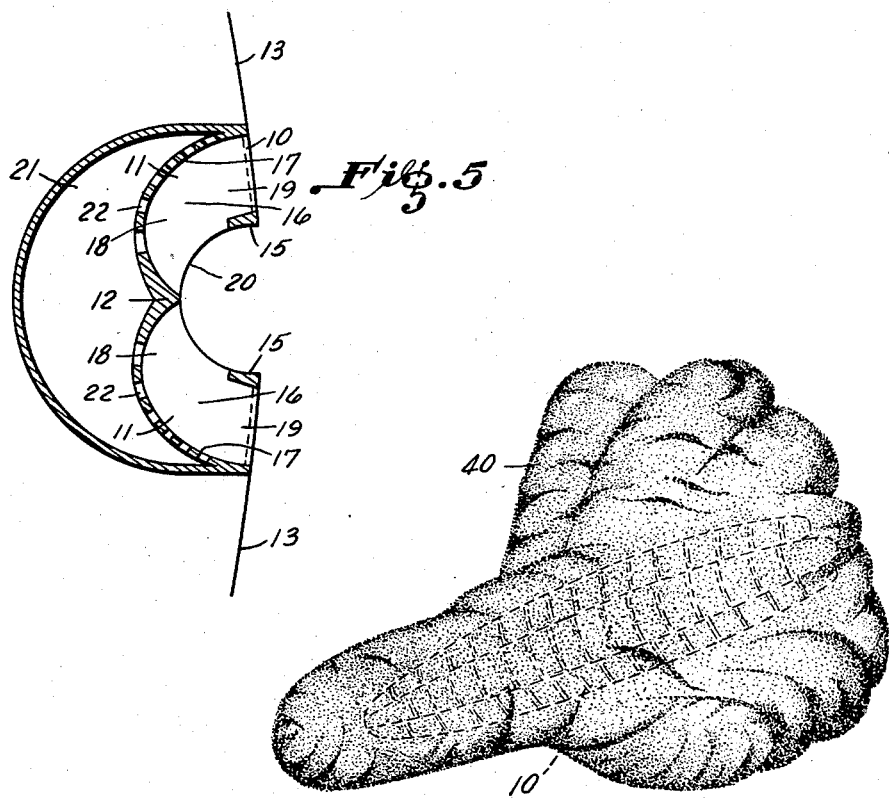

United States Patent Office 2,859,663
Patented Nov. 11, 1958

2,859,663

GUN BLAST DEFLECTOR

Karl Irbitis, Montreal, Quebec, Canada, assignor to Canadair Limited, Montreal, Quebec, Canada Application February 28, 1955, Serial No. 491,155

12 Claims. (Cl. 89—14)

This invention relates to gun blast deflectors and more particularly to the suppression of the forward pattern of the gas envelope as it is released from the muzzle of the gun. The invention is particularly applicable to the installation of guns in high speed aircraft where, under normal circumstances, the gases ejected from the gun muzzle tend to block out the vital air supply required for maximum efficiency of the aircraft engines, particularly at high altitudes. Should the pattern of the gas envelope be such that it interferes with and breaks down the supply of air required by the engines, compressor stall will take place with serious consequences until the condition is relieved either by ceasing gun fire or maneuvering of the aircraft. Also, should the gun muzzles be located on the aircraft fuselage, the pattern of the gas envelope will have a deleterious effect on the operation of the aircraft and the firing speed of the guns themselves.

The prime object of this invention is to eliminate to a very great extent the troubles encountered from gun gases in the operation of jet aircraft by suppressing the forward movement of the gases as they leave the muzzle of the gun and to reduce the area of dispersal so that the gases do not dilute the air flow to the engines of the aircraft.

A further object is to dissipate the high pressure gases from the area of the muzzle of the gun without retarding the high rate of fire.

A further object is to deflect and disperse the high temperature gases from the fuselage of the aircraft and thereby reduce skin temperature normally encountered at the point where the gun muzzle projects from the fuselage when the gun is operated at maximum fire power at high altitudes.

A further object is to provide an efficient gas dispersal unit for gun muzzles which can be installed in an aircraft fuselage without in any way interfering with the streamlining of the fuselage.

A further object is to provide a gas dispersal unit which will eliminate bullet dispersion normally caused by unsymmetric interaction between the shock waves caused by the bullet and the concentric inside surface of the blast tube in the vicinity of the sloped outlet on the side of the aircraft fuselage.

A further object is to provide a gas dispersal unit which can be fabricated or cast in the high temperature metals now required in jet aircraft.

The following specification and the drawing accompanying set forth in detail the description of one preferred form of the invention as applied to a gun mounted in an aircraft fuselage. It is to be clearly understood, however, that the invention is not to be limited to such an installation but can be applied to any type of gun in any type of vehicle or vessel where the gun is mounted within the vehicle or vessel and is aimed or projected through the wall or shell of such vehicle or vessel.

In the drawings:

Fig. 1 is a face view of the blast deflector.

Fig. 2 is a horizontal section on the line 2—2 of Fig. 1.

Fig. 3 is an enlarged vertical section on the line 3—3 of Fig. 1.

Fig. 4 is a horizontal section similar to Fig. 2 but showing an expansion chamber located on the back of the deflector and having apertures communicating with the open face of the deflector.

Fig. 5 is an enlarged vertical section similar to Fig. 3 but taken on the line 5—5 of Fig. 4.

Fig. 6 is a view showing the spear shape pattern of the gas envelope drawn back towards the rear of the gun muzzle outlet.

Referring particularly to Figs. 1, 2 and 3 of the drawings, the deflector 10 is adapted to be fitted on the inner surface of an aircraft fuselage and to the muzzle of a gun whose axis is projected through the aircraft fuselage, and consists of an elliptical shaped open-faced body formed of two involute type curved bodies 11 joined together on the inner center line by the ridge 12, which preferably has a relatively sharp edge facing outward. This joining ridge 12 of the two involute type curves is at a fixed radius from the center line of the gun barrel, sufficient only to allow free passage of the projectile from the gun and extends the full length of the major axis of the elliptical shaped deflector. It is here understood that there is no limit on the calibre of the gun and the projectile fired from it, to which this device can be fitted.

The elliptical shaped body of the deflector 10 is substantially wedge-shaped, and its outward facing surface follows the contour of the outer surface and at the same time seals the opening in the fuselage formed to provide a clear passage for the gun projectile. The rear end of the deflector 10 is provided with a round bore and for fitting over the muzzle of the gun barrel. From this point forward the body tapers down to a relatively sharp point at the forward end with the ridge 12.

In the particular installation herein referred to the centre line of the gun barrel is located with respect to the fuselage of the aircraft indicated by the curved surface 13, which, at the section shown in Fig. 3, passes approximately through the center line of the gun barrel. However, as the fuselage tapers inwards, the outer surface of the deflector 10 represented by the edges 14 of the involute bodies 11 and the supporting ribs 15, follow the surface of the fuselage, it will be seen that approximately the rear half of the deflector is built up to catch and deflect a large volume of the gases as they leave the gun muzzle, whereas the forward half of the deflector falls back from the center line of the gun barrel so that, while any gases proceeding that far forward will be considerably less in volume they will be deflected in an area away from the passing projectile and likely to impose less shock forces, by reason of the falling away of the fuselage surface, tending to disperse the projectile.

The open face of the deflector 10 is comprised of the outer edges 14 of the involute curved bodies 11 and the supporting ribs 15 which are substantially parallel to the edges 14 and join therewith at the forward and rear ends of the ellipse shaped body 10.

A series of curved blades 16 are set on each side of the centre line ridge 12. These blades 16 are welded to or otherwise joined to the inner surface 17, of the involute curved bodies 11 and sweep sharply forward in a part helix curve at 18 and then curve back on themselves at 19, in the form of bucket shaped turbine blades to terminate between and flush with the edges 14 of the involute bodies 11 and the supporting ribs 15. The edges 20 of the blades 16 are cut to conform to the same radius as the inner edge 12 of involute bodies 11 and of the supporting ribs 15.

The curves of the blades as they sweep forward are such as to deflect the gases leaving the muzzle 30 of the gun barrel 31 from the line of travel of the projectile and pass them in a rotary motion around the projectile path to be dispersed sharply backwards. The outer edges 19 of the blades 16 are also angled in a forward direction between the supporting ribs 15 and the outer edges 14 of the involute bodies 11. This has the effect of shaping the pattern of the gas envelope 40 in a mushroom or wedge shaped form with the stem of the mushroom or wedge being projected forwardly substantially as shown in Fig. 6 of the drawings. Such a shape of gas envelope is the reverse of the normally forward projecting mushroom and allows the air stream to disperse the gas more efficiently to prevent it from spreading in front of the engine air intakes. In order to substantially reduce the built up pressure of the gases at the muzzle exit at each firing of the gun, an expansion chamber 21 is formed on the back of the involute bodies 11 as shown in Figs. 4 and 5 of the drawings. This chamber 21 in section is in the form of a crescent and extends lengthwise for the full length of the gun blast deflector. The actual form of the expansion chamber 21 will depend to a large extent on the shape of the air frame around the location of the gun and on the space available for its installation. A series of apertures either around holes or slots 22 in the involute bodies 11 allow the gases to pass into the expansion chamber 21 when the gas pressure is at its highest value at each firing of the gun. This has the effect of reducing the value of the shock waves which tend to divert the following projectile as it leaves the muzzle of the gun. In the interval between the passing of projectiles from the gun muzzle through the deflector and between the high intensity shock waves, the gases which have entered the expansion chamber 21, will filter out to the atmosphere through the apertures 22, at a greatly reduced pressure. The holes or slots 22 are located between each of the blades 16 and their combined area is determined by the pressure and volume of the gases present between blades with the area of the holes or slots being greater adjacent the gun muzzle and gradually decreasing forwardly. The result of the gas envelope form developed with the use of the present invention is that the projectile, as it leaves the muzzle of the gun, is subjected to much less intense shock wave forces resulting in the projectile proceeding in a straight path from the gun.

The shock waves are further reduced in value where the high pressure gases enter the expansion chamber 21 when the pressure is at a peak when the projectile is leaving the gun muzzle and leaving the expansion chamber to be dissipated in the atmosphere at a greatly reduced pressure valve after the projectile has passed beyond the deflector and before another projectile leaves the gun muzzle. Such action eliminates the dispersal of a large number of projectiles from their targets as is the case where intense and uncontrolled shock forces interfered with their directed path.

It is therefore evident that this invention will have considerable advantage over any type of deflector hitherto in use, as it has a beneficial effect not only in the more efficient operation of the gun itself by eliminating the wasteful dispersal of projectiles but also in eliminating to a large extent the intake of gun gases into the engine.

The gases released by the gun and deflected through the vanes in a backward direction will have the effect of creating a considerable forward thrust, resulting in a reduction of gun recoil forces transmitted to the supporting structure. Such a reduction in recoil forces will in turn allow for a reduction in the weight of the supporting structure which, when multiplied by the number of guns installed, could be considerable. A further benefit in the reduction of gun recoil forces will result in increased maneuverability when firing individual guns or groups of guns when flying at high speed.

What I claim is:

1. In a gun blast deflector, an open-faced member comprising a pair of involute curved bodies joined in a center ridge located parallel with and at a fixed distance from the center line of the gun barrel, the said involute curved bodies being located in a plane which intersects the gun barrel axis, a series of formed blades attached to each of the said involute curved bodies, said blades being projected forwardly and outwardly from the center ridge and then curved back on themselves to receive and deflect the gun gases from the path of the projectile.

2. In a gun blast deflector, an open-faced member open at one end to receive the muzzle of a gun, said member comprising a pair of involute curved bodies joined in a center ridge located parallel with and at a fixed distance from the center line of the gun barrel, the said involute curved bodies being located in a plane which intersects the gun barrel axis, said member having its open face tapering down from rear to front to merge into the center ridge, a series of formed blades attached to each of the said involute curved bodies, said blades being projected forwardly and outwardly from the center ridge and then curved back on themselves to receive and deflect the gun gases from the path of the projectile.

3. In a gun blast deflector, an open faced member open at one end to receive the muzzle of a gun, said member comprising a pair of involute curved bodies joined in a center ridge located parallel with and at a fixed distance from the center line of the gun barrel, the said involute curved bodies being located in a plane which intersects the gun barrel axis, said member having its open face tapering down from rear to front to merge into the center ridge, a series of formed blades attached to each of the said involute curved bodies, said blades being projected forwardly and outwardly from the center ridge and then curved back on themselves, and an expansion chamber on the back of each of said involute members into which the gases pass from the involute members when the gas pressure is at its highest value and out of which the gases pass to the involute members, the said involute members deflecting the gases from the expansion chamber from the path of the projectile.

4. A gun blast deflector for attachment to the fuselage of an aircraft and to the muzzle of a gun installed therein, the said gun blast deflector, comprising a body member sealing the opening in the aircraft fuselage, through which the projectile from the said gun passes, the said body member comprising a pair of involute curved members disposed longitudinally on one side of the axis of the barrel of the said gun and within the fuselage of the aircraft and presenting an open face on the exterior surface of the aircraft fuselage, a longitudinally extending ridge separating said involute curved members, the said ridge lying close to and parallel with the path of travel of a projectile from the said gun, and a series of bucket-type vanes located within said involute curved members and extending from said longitudinal ridge to a plane coincident with the outer surface of the aircraft fuselage, each of said bucket vanes extending laterally from said ridge with a forward and then aft curvature and having their inner edges at a radius coaxial with the axis of said gun.

5. A gun blast deflector for attachment to the fuselage of an aircraft and to the muzzle of a gun installed therein, the said gun blast deflector comprising an elliptically shaped body member sealing the opening in the aircraft fuselage through which the projectile from the said gun passes, the said body member comprising a pair of involute curved members disposed longitudinally on one side of the axis of the barrel of the said gun and within the fuselage of the aircraft and presenting an open face on the exterior surface of the aircraft fuselage, a longitudinally extending ridge separating said involute curved members, the said ridge lying close to and parallel with the path of travel of a projectile from the said gun, and a series of bucket type vanes located within said involute curved members and extending from said longitudinal ridge to a plane coincident with the outer surface of the aircraft fuselage, each of said bucket vanes extending laterally from said ridge with a forward and then aft curvature with the outward facing edges of the vanes set approximately at right angles to the adjacent edge of the elliptically shaped body member and having their inner edges at a radius coaxial with the axis of said gun.

6. A gun blast deflector for attachment to the fuselage of an aircraft and to the muzzle of a gun installed therein, the said gun blast deflector comprising an elliptically shaped body member sealing the opening in the aircraft fuselage, through which the projectile from the said gun passes, the said body member comprising a pair of involute curved members disposed longitudinally on one side of the axis of the barrel of the said gun and within the fuselage of the aircraft and presenting an open face on the exterior of the aircraft fuselage, a longitudinally extending ridge separating said involute curved members, the said ridge lying close to and parallel with the path of travel of a projectile from the said gun, and a series of bucket type vanes located within said involute curved members and extending from said longitudinal ridge to a plane coincident with the outer surface of the aircraft fuselage, each of said bucket vanes extending laterally from said ridge with a forward and then aft curvature with the outward facing edges of the vanes set approximately at right angles to the adjacent edge of the elliptically shaped body member and having their inner edges at a radius coaxial with the axis of said gun, the said vanes forming with each other a series of gas dispersing slots disposed inwardly from the outer edges of said elliptically shaped body.

7. A gun blast deflector for attachment to the fuselage of an aircraft and to the muzzle of a gun installed therein, the said gun blast deflector comprising an elliptically shaped body member sealing the opening in the aircraft fuselage through which the projectile from the said gun passes, the major axis of said elliptically shaped body being disposed parallel with the axis of the said gun, the said body member comprising a pair of involute curved members disposed longitudinally on one side of the axis of the barrel of the said gun and within the fuselage of the aircraft and presenting an open face on the exterior surface of the aircraft fuselage, a longitudinal ridge extending the full length of said elliptical shaped body and separating said involute curved members, the said ridge lying close to and parallel with the path of travel of a projectile from the said gun, and a series of bucket type vanes located within said involute curved members and extending from said longitudinal ridge to a plane coincident with the outer surface of the aircraft fuselage, each of said bucket vanes extending laterally from said ridge with a forward and then an aft curvature with the outward facing edges of the vanes set approximately at right angles to the adjacent edge of the elliptically shaped body member and having their inner edges at a radius coaxial with the axis of said gun, the said vanes forming with each other a series of gas dispersing slots disposed inwardly from the outer edges of said elliptically shaped body.

8. A gun blast deflector for attachment to the fuselage of an aircraft and to the muzzle of a gun installed therein, the said gun blast deflector comprising an elliptically shaped body member sealing the opening in the aircraft fuselage through which the projectile from the said gun passes, the major axis of said elliptically shaped body being disposed parallel with the axis of the said gun, the said body member comprising a pair of involute curved members disposed longitudinally on one side of the axis of the barrel of the said gun and within the fuselage of the aircraft the inner faces of said elliptically shaped body being substantially parallel with the axis of said gun and presenting an open outer face coincident with the exterior surface of the aircraft fuselage as it crosses the axis of the said gun, a longitudinal ridge extending the full length of said elliptically shaped body and separating said involute curved members, the said ridge lying close to and parallel with the path of travel of a projectile from the said gun, and a series of bucket type vanes located within said involute curved members and extending from said longitudinal ridge to a plane coincident with the outer surface of the aircraft fuselage, each of said bucket vanes extending laterally from said ridge with a forward and then an aft curvature with the outward facing edges of the vanes set approximately at right angles to the adjacent edge of the elliptically shaped body member and having their inner edges at a radius coaxial with the axis of said gun, the said vanes forming with each other a series of gas dispersing slots disposed inwardly from the outer edges of said elliptically shaped body.

9. A gun blast deflector for attachment to the fuselage of an aircraft and to the muzzle of a gun installed therein, the said gun blast deflector comprising an elliptically shaped body member sealing the opening in the aircraft fuselage through which the projectile from said gun passes, the said body member comprising a pair of involute curved members disposed longitudinally on one side of the axis of the barrel of the said gun and within the fuselage of the aircraft and presenting an open face on the exterior surface of the aircraft fuselage, a longitudinally extending ridge separating said involute curved members, the said ridge lying close to and parallel with the path of travel of a projectile from the said gun, a series of bucket type vanes located within said involute curved members and extending from said longitudinal ridge to a plane coincident with the outer surface of the aircraft fuselage, each of said bucket vanes extending laterally from said ridge with a forward and then aft curvature, with the outward facing edges of the vanes set approximately at right angles to the adjacent edges of the elliptically shaped body member and having their inner edges at a radius coaxial with the axes of said gun, and an expansion chamber on the back of said involute members into which the gases pass from the involute members when the gas pressure therein is at its highest value.

10. A gun blast deflector for attachment to the fuselage of an aircraft and to the muzzle of a gun installed therein, the said gun blast deflector comprising an elliptically shaped body member sealing the opening in the aircraft fuselage through which the projectile from the said gun passes, the major axis of said elliptically shaped body being disposed parallel with the axis of the said gun, the said body member comprising a pair of involute curved members disposed longitudinally on one side of the axis of the barrel of the said gun and within the fuselage of the aircraft, the inner faces of said elliptically shaped body being substantially parallel with the axis of said gun and presenting an open outer face coincident with the exterior surface of the aircraft fuselage as it crosses the axis of said gun, a longitudinal ridge extending the full length of said elliptically shaped body and separating said involute curved members, the said ridge lying close to and parallel with the path of travel of a projectile from the said gun, a series of bucket type vanes located within said involute curved members and extending from said longitudinal ridge to a plane coincident with the outer surface of the aircraft fuselage, each of said bucket vanes extending laterally from said ridge with a forward and then an aft curvature with the outward facing edges of the vanes set approximately at right angles to the adjacent edge of the elliptically shaped body member and having their inner edges at a radius coaxial with the axis of said gun, the said vanes forming with each other a series of gas dispersing slots disposed inwardly from the outer edges of said elliptically shaped body, and an expansion chamber on the back of said involute members into which the gases pass from the involute members when the gas pressure therein is at its highest value.

11. A gun blast deflector as set forth in claim 8, in which the open outer face of the elliptically shaped body is bevelled on a line crossing the axis of the gun as it emerges from the body of aircraft.

12. A gun blast deflector as set forth in claim 11, in which the bucket type vanes are reduced in size coincident with the bevelled outer face of the elliptically shaped body.

References Cited in the file of this patent

UNITED STATES PATENTS

| 2,101,849 | Green | Dec. 14, 1937 |
| 2,442,382 | Sieg | June 1, 1948 |
| 2,787,194 | Peterson | Apr. 2, 1957 |

FOREIGN PATENTS

| 128,498 | Austria | May 25, 1932 |
| 454,533 | Great Britain | Oct. 2, 1936 |